United States Patent [19]

Masuda et al.

[11] Patent Number: 4,605,441
[45] Date of Patent: Aug. 12, 1986

[54] INK COMPOSITION FOR INDICATING PROGRESS AND COMPLETION OF VULCANIZATION OF RUBBER PRODUCTS

[75] Inventors: Yoshiaki Masuda, Hirakata; Hidetoshi Fukuo, Takarazuka; Masaji Yamamoto, Amagasaki, all of Japan

[73] Assignee: Sakura Color Products Corporation, Osaka, Japan

[21] Appl. No.: 643,452

[22] Filed: Aug. 23, 1984

Related U.S. Application Data

[63] Continuation-in-part of Ser. No. 419,443, Sep. 17, 1982, abandoned.

[30] Foreign Application Priority Data

Sep. 24, 1981 [JP] Japan ................................ 56-151875

[51] Int. Cl.$^4$ .............................................. C09D 11/00
[52] U.S. Cl. ........................................ 106/21; 106/26; 106/30; 524/35; 524/270; 524/515; 524/519; 525/54.4; 525/213; 525/220; 525/227; 525/240; 525/292; 525/390; 525/398; 525/404; 525/403; 525/418; 525/521
[58] Field of Search ............... 106/26, 21, 30; 524/35, 524/270, 515, 519; 525/54.4, 213, 220, 227, 240, 292, 390, 398, 403, 404, 418, 521

[56] References Cited

U.S. PATENT DOCUMENTS 2,538,397  1/1951  Szwarc ............................ 524/270

FOREIGN PATENT DOCUMENTS 52-2324  1/1977  Japan .
52-2325  1/1977  Japan .

*Primary Examiner*—Amelia B. Yarbrough
*Attorney, Agent, or Firm*—Larson and Taylor

[57] ABSTRACT

An ink composition for indicating progress and completion of vulcanization of rubber articles comprising, per 100 parts by weight of the composition, (i) 0.01 to 10 parts by weight of at least one methine dye,
(ii) 1 to 40 parts by weight of at least one member selected from the group consisting of rosin, rosin derivative, petroleum resin, phenol resin, xylene resin, alkyd resin, cumarone-indene resin, acrylic resin, epoxy resin, ketone resin and styrene-maleic acid resin,
(iii) 0.5 to 50 parts by weight of at least one high molecular weight component selected from the group consisting of cellulose resin, polyvinyl butyral, vinyl chloride-vinyl acetate copolymer, ethylene-vinyl acetate copolymer, polyamide, synthetic rubber and natural rubber,
(iv) 30 to 80 parts by weight of at least one organic solvent capable of dissolving the components (ii) and (iii), and
(v) 0.1 to 50 parts by weight of at least one halogenated organic acid.

10 Claims, No Drawings

INK COMPOSITION FOR INDICATING PROGRESS AND COMPLETION OF VULCANIZATION OF RUBBER PRODUCTS

This application is a continuation-in-part of our co-pending application Ser. No. 419,443, filed Sept. 17, 1982, now abandoned.

This invention relates to an ink composition for indicating progress and completion of vulcanization of rubber products by the discoloration or fading of the composition.

At present vulcanization of rubber products is carried out according to conditions for vulcanization such as time and temperature which are determined depending on the kind of rubber, the kind of vulcanizing agent, the shape and dimensions of rubber articles and so on. However, it is difficult to maintain uniformly the temperature in a vulcanization chamber of rubber articles. Further, rubber articles keep the appearance substantially unchanged during vulcanizing operation so that the operator can not directly detect, by visual inspection of individual rubber articles, whether the articles have been satisfactorily vulcanized. For these reasons, difficulty is entailed in preventing the production of defective rubber articles due to insufficient or excessive vulcanization. Moreover, such inadequate vulcanization poses problems concerning misvulcanized rubber articles, cumbersome inspection of rubber articles and consumption of more energy than is needed.

It is an object of this invention to provide means for accurately indicating progress and completion of vulcanization of rubber articles.

It is another object of the invention to provide means for preventing the loss of rubber articles due to insufficient or excessive vulcanization by accurately indicating completion of vulcanization of rubber articles.

It is a further object of the invention to provide means for eliminating the time-consuming inspection of vulcanized rubber articles with simple visual inspection of the articles.

It is a still further object of the invention to provide means for minimizing the waste of heat in vulcanization by adequately vulcanizing rubber articles.

Other objects and features of this invention will become more apparent from the following description.

The invention provides an ink composition for indicating progress and completion of vulcanization of rubber articles comprising, per 100 parts by weight of the composition, (i) 0.01 to 10 parts by weight of at least one methine dye, (ii) 1 to 40 parts by weight of at least one member selected from the group consisting of rosin, rosin derivative, petroleum resin, phenolic resin, xylene resin, alkyd resin, cumarone-indene resin, acrylic resin, epoxy resin, ketone resin and styrenemaleic acid resin, (iii) 0.5 to 50 parts by weight of at least one high molecular weight component selected from the group consisting of cellulose resin, polyvinyl butyral, vinyl chloride-vinyl acetate copolymer, ethylene-vinyl acetate copolymer, polyamide, synthetic rubber and natural rubber, (iv) 30 to 80 parts by weight of at least one organic solvent capable of dissolving the components (ii) and (iii), and (v) 0.1 to 50 parts by weight of at least one halogenated organic acid represented by the formula

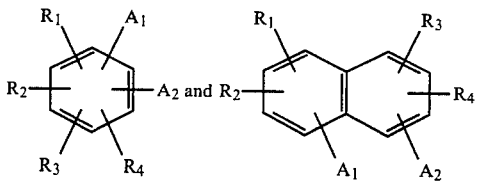

wherein $R_1$, $R_2$, $R_3$ and $R_4$ represent halogen, hydrogen, $C_1$–$C_4$ alkyl, amino, nitro, hydroxyl, $C_1$–$C_4$ alkoxy with the proviso that at least one of $R_1$, $R_2$, $R_3$ and $R_4$ is halogen: $A_1$ and $A_2$ are the same or different and represent hydrogen, —COOH or —$SO_3H$ or, are combined together to form an anhydride when they are —COOH with the proviso that both $A_1$ and $A_2$ are not hydrogen at the same time.

Our research reveals that the ink composition comprising the five components (i) to (v) is high in adhesion to rubber articles to be vulcanized; the coating formed on the rubber articles is not easily separable from the article being vulcanized even if the article has changed its chemical and physical properties and shape by vulcanization; and the coating markedly discolors or fades after the article has been vulcanized at a specific temperature for a specific time, and that the present ink composition with such properties is able to accurately indicate completion of vulcanization of rubber articles. This invention has been accomplished based on these novel findings.

According to this invention, at least one methine dye having one or more methine groups is used as the coloring component (i) for directly indicating progress and completion of vulcanization of rubber articles. Examples of methine dyes useful in the invention are classified below according to colors and Color Index numbers.

(a)

Methine dye: Basic Yellow 11, 12, 14, 22, 23, 28, 29, 33, 35, 40, 48, 49, 51, 52, 53
Cyanine dye: Basic Yellow 13
Polymethine dye: Basic Yellow 21, 43, 44
Azo-methine dye: Basic Yellow 24, 45

(b)

Methine dye: Basic Orange 21, 22, 27, 44, 46
Azo-methine dye: Basic Orange 42

(c)

Methine dye: Basic Red 12, 13, 15, 27, 35, 36, 37, 48, 49, 52, 53, 66
Cyanine dye: Basic Red 14, 68
Azo-methine dye: Basic Red 45

(d)

Methine dye: Basic Violet 7, 15, 16, 40
Cyanine dye: Basic Violet 39
Polymethine dye: Basic Violet 20, 21, 27

(e)

Methine dye: Basic Blue 62, 69

Among these methine dyes, preferred dyes are C.I. Basic Red 12, 13, 14, 15 and 37, C.I. Basic Yellow 11 and 13, C.I. Basic Violet 15, etc. The coloring component (i) is used in an amount of 0.01 to 10% by weight, preferably 0.5 to 5% by weight, based on the composition. When the dye is used in lesser amount, the ink composition does not show clear color. With the dye employed in excess amount, the composition fails to distinctly discolor or fade, thereby failing to clearly indicate completion of vulcanization.

These dyes are able to improve the water resistance of the composition when used as a kind of adduct prepared by bringing the dye into contact with phenolic resin or rosin or rosin derivative as disclosed in Japanese Patent No. 878644 (Japanese Examined Patent Publication No. 2324/1977).

Useful resin components (ii) soluble in organic solvent include rosin, hydrogenated rosin, glycerin ester thereof, pentaerythritol ester thereof and like derivatives; dammar, shellac and like natural resins: petroleum resin: phenol-modified alkyd resin, styrenated alkyd resin, epoxy ester and like alkyd resins; rosin-modified phenolic resin and like phenolic resins; rosin-modified xylene resin, alkylphenol xylene resin and like xylene resins; coumarone-indene resin; acrylate or methacrylate polymer or copolymer and like acrylic resin; ketone resin; rosin-modified maleic acid resin, styrene-maleic acid copolymer; etc. Preferable examples of the resin component are rosin derivatives, petroleum resins, phenolic resins, ketone resins and styrene-maleic acid copolymers. Among the resins of the same kind, it is advantageous to use the resin having a higher softening point because the coating formed from such resin does not flow during vulcanization and articles formed with the coatings do not adhere each other. At least one of these resins is used as the resin component (ii) in an amount of 1 to 40% by weight, preferably 5 to 20% by weight, based on the ink composition.

Usable as the high molecular weight component (iii) soluble in organic solvent are rubbers and synthetic resins capable of imparting elasticity to the coating. Examples of such rubbers are isobutylene rubber, isoprene rubber, styrene-butadiene rubber, butadiene rubber, nitrile rubber, ethylene-propylene rubber, chloroprene rubber and like synthetic rubbers and natural rubber. Useful synthetic resins include methoxy cellulose, nitrocellulose, acetyl cellulose and like cellulose resins, polyvinyl butyral, vinyl chloride-vinyl acetate copolymer, ethylene-vinyl acetate copolymer, polyamide and like resins. At least one of them is used as the high molecular weight component (iii) in an amount of 0.5 to 50% by weight, preferably 5 to 20% by weight, based on the ink composition. The amounts of the resin component (ii) and the high molecular weight component (iii) to be used in this invention closely correlates to each other. Any one of the components (ii) and (iii) employed in lesser or excess amount leads to impaired adhesion of the ink composition to the rubber article, thereby causing likelihood of the coating being easily separated from the article during vulcanization.

At least one of organic solvents usually used as the solvent for inks is usable as the organic solvent (iv). Examples of the organic solvents capable of dissolving the components (ii) and (iii) are shown below.

(a) Aliphatic alcohols: ethanol, n-propyl alcohol, isopropyl alcohol, n-butyl alcohol, iso-butyl alcohol, n-amyl alcohol, n-hexyl alcohol, methyl amyl alcohol, 3-heptyl alcohol and the like.

(b) Alicyclic alcohols: cyclohexyl alcohol, 2-methylcyclohexyl alcohol and the like.

(c) Heterocyclic alcohols: furfuryl alcohol, tetrahydrofurfuryl alcohol and the like.

(d) Aromatic alcohols: benzyl alcohol and the like.

(e) Halogenated hydrocarbons: methylene chloride, chloroform, tetrachloromethane, ethylene chloride, trichloroethane, tetrachloroethane, dichloropropane, n-butyl chloride, ethylene bromide and the like.

(f) Halogenated aromatic hydrocarbons: chlorobenzene, dichlorobenzene and the like.

(g) Ethers: isopropyl ether, n-butyl ether, anisol, phenetol, epichlorohydrin, 1,4-dioxane, furfural, tetrahydrofuran, tetrahydropyran and the like.

(h) Ketones: acetone, methyl ethyl ketone, methylisobutylketone, methyl-n-amyl ketone, methyl-n-hexyl ketone, diethyl ketone, acetonylacetone, mesityl oxide, phorone, isophorone, cyclohexanone, methylcyclohexanone, acetophenone and the like.

(i) Ethylene glycol alkyl ethers: ethylene glycol monomethyl ether, ethylene glycol monoethyl ether, ethylene glycol diethyl ether, ethylene glycol isopropyl ether, ethylene glycol monobutyl ether, ethylene glycol dibutyl ether, diethylene glycol monobutyl ether and the like.

(j) Hydrocarbons: n-pentane, iso-octane, n-hexane, n-decane, n-heptane, 2,2-dimethylbutane, n-octane, cyclohexane, methylcyclohexane, decalin, benzene, toluene, xylene, ethylbenzene, diethylbenzene, cumene, amylbenzene, p-cymene, tetralin, p-menthane and the like.

(k) Ethylene glycol alkyl esters: ethylene glycol monomethyl ether acetate, ethylene glycol monoethyl ether acetate, ethylene glycol monobutyl ether acetate, diethylene glycol monoethyl ether acetate, diethylene glycol monobutyl ether acetate, diethylene glycol monoacetate and the like.

(l) Esters: ethyl formate, n-butyl formate, ethyl acetate, n-propyl acetate, iso-butyl acetate, n-butyl acetate, n-amyl acetate, methoxybutyl acetate, cyclohexyl acetate, benzyl acetate, ethyl propionate, ethyl butyrate, ethyl hydroxy-iso-butyrate, n-butyl stearate, ethyl acetoacetate, methyl lactate, butyl lactate, methyl benzoate and the like.

The amount of the organic solvent (iv) to be used is determined depending on the viscosity of the ink composition, the stability thereof in use and during storage, the drying rate thereof on application, etc. The organic solvent is employed in an amount of 30 to 80% by weight, preferably 40 to 60% by weight, based on the ink composition.

With this invention, at least one of halogenated organic acids and anhydrides thereof which do not volatilize or sublimate at the vulcanization temperature are incorporated in the ink composition to control the discoloration or fading of the colorant component (i) and to adjust the occurence of discoloration to the time for completion of vulcanization. The acid is used in an amount of 0.1 to 50 parts by weight, preferably 0.5 to 25 parts by weight, per 100 parts by weight of the ink composition. The halogenated organic acids are represented by the following formulas.

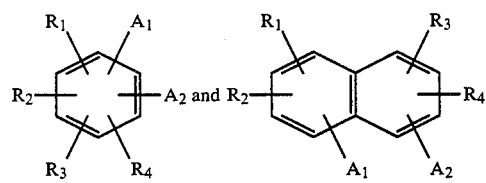

wherein $R_1$, $R_2$, $R_3$ and $R_4$ represent halogen, hydrogen, $C_1$-$C_4$ alkyl, amino, nitro, hydroxyl, $C_1$-$C_4$ alkoxy with the proviso that at least one of $R_1$, $R_2$, $R_3$ and $R_4$ is halogen: $A_1$ and $A_2$ are the same or different and represent hydrogen, —COOH or —SO$_3$H or, are combined together to form an anhydride when they are —COOH with the proviso that both $A_1$ and $A_2$ are not hydrogen at the same time. Preferable examples of halogenated organic acids and anhydride thereof are chlorophthalic anhydrides such as chlorophthalic anhydride, and tetrachlorophthalic anhydride, bromophthalic anhydrides such as bromophthalic anhydride, and tetrabromophthalic anhydride, 4-chlorobenzenesulfonic acid, 2-fluoronaphthalenedisulfonic acid, 5-chlorosalicylic acid, 2,3,4-trichlorobenzoic acid, etc.

Further the ink composition of this invention may contain at least one of oil-soluble dyes and pigments which have high dispersibility in inks in order to give marked differences in color tone of the present ink between before and after vulcanization and to more accurately indicate completion of vulcanization. Examples of pigments useful in this invention are tianium dioxide, red iron oxide, ultramarine, chrome oxide, cadmium maroon, chrome orange, chrome yellow, cadmium yellow, Carmine 6B, Indanthrene Blue, Hansa Yellow, Alizarine Maroon, Phthalocyanine Green, Phthalocyanine Blue and Lake Red. These pigments are used in an amount of about 0.1 to about 50 parts by weight, per 100 parts by weight of the composition. Oil-soluble dyes are those generally known, such as phthalocyanine dyes, pyrazolone dyes, anthraquinone dyes, azo dyes, chromium complex dyes, etc. Examples of phthalocyanine dyes are Oil Blue BOS (trade mark, product of Orient Chemical Industries Ltd., Japan), Solvent Blue 55 (e.g. Neozapon Blue FLE, trade mark, product of BASF AG., West Germany), etc. Examples of pyrazolone dyes are Solvent Yellow 19 (e.g. Vari Fast yellow 3104, trade mark, product of Orient Chemical Industries Ltd., Japan), Solvent Yellow 21 (e.g. Neozapon Yellow R, trade mark, product of BASF AG., West Germany), etc. Examples of anthraquinone dyes are Solvent Violet 14 (e.g. Oil Violet 732, trade mark, product of Orient Chemical Industries Ltd., Japan), etc. Examples of azo dyes afr Fast Orange RR (trade mark, product of Dainichi Seika Color & Chemicals Manufacturing Co., Ltd., Japan), etc. These dyes are used in an amount of about 0.01 to about 2 parts by weight, per 100 parts by weight of the composition.

Known plasticizers such as dibutyl phthalate, dioctyl phthalate, tricresyl phosphate, etc. may be added in an amount of 2 to 10% by weight based on the combined weight of the resin component (ii) and the high molecular weight component (iii) to improve the properties of the coating formed from the components (ii) and (iii).

At least one of surfactants, and like additives conventionally used in ink compositions may be incorporated into the ink composition of this invention. Examples of useful surfactants are nonionic surfactants, such as polyoxyethylene alkyl ether, polyoxyethylene alkylphenyl ether, polypropylene glycol-polyethylene glycol ether, fatty acid esters of polyethylene glycol, silicone-containing surfactants, fluorine-containing surfactants and the like. Examples of useful preservatives are sodium benzoate, potassium sorbate, pentachlorophenol sodium salt, phenol, etc.

The ink composition of this invention can be prepared by various processes. For example, a methine dye (i) is dissolved in a portion of an organic solvent (iv) with stirring at a temperature ranging from room temperature to 80° C. When a pigment is used, it may be dispersed therein at the same time. A resin component (ii) and a high molecular weight component (iii) are dissolved in the remaining portion of the organic solvent (iv) with stirring at room temperature to 80° C. The two solutions thus prepared are mixed together, a halogenated organic acid (v) is added thereto and the mixture is stirred at 50° to 80° C.

As a second choice, a dye (i) and a portion of a resin component (ii) are dissolved in a portion of an organic solvent (iv). The solution thus obtained is mixed with a solution of the remaining portion of the component (ii) and a high molecular weight component (iii) and a halogenated organic acid (v) in a remnant of the solvent.

As a third choice, a solvent (iv) exellent in dissolving a dye (i) is mixed with another solvent (iv) which is able to dissolve a high molecular weight component (iii) in a high concentration. Then a dye (i), resin component (ii), high molecular weight (iii) and halogenated organic acid (v) are dissolved in the mixture of the two solvents.

This invention will be described below in more detail with reference to examples in which parts are all by weight.

EXAMPLE 1

An orange ink composition of this invention was prepared by using the following components.

| | |
|---|---|
| Vinyl chloride-vinyl acetate resin ("Denka Vinyl #1000A", Denki Kagaku Kogyo Co., Ltd., Japan) | 50 parts |
| Phenolic resin ("Tamanol 100S", Arakawa Chemical Co., Ltd., Japan) | 70 parts |
| Isophorone | 700 parts |
| Toluene | 400 parts |
| Coloring agent (50 parts of rubber and 50 parts of pigment) | 100 parts |
| C.I. Basic Yellow 11 | 30 parts |
| Bromophthalic anhydride | 120 parts |

The ink composition was applied to rubber hose which was then vulcanized at 150° C. for 25 minutes. The coating formed on the rubber article changed its color to red in 25 minutes. The inspection of the product revealed that it was satisfactorily vulcanized.

The ink compositions prepared in this example and other examples to be described later were found to be easily applicable and highly adherent to rubber and the coating formed was found not to have been separated from the article during vulcanizing operation.

EXAMPLE 2

A red ink composition of this invention was prepared by uniformly mixing the following components.

| | |
|---|---|
| Petroleum resin ("Mitsui Hi-lets G-100X", Mitsui Petrochemical Co., Ltd., Japan) | 100 parts |
| Butadiene rubber ("Nipol BR 1441", Nippon Zeon Co., Ltd., Japan) | 60 parts |
| Ethylene glycol monoethyl ether | 150 parts |
| Xylene | 750 parts |
| Oil soluble dye ("Oil Blue #8", Chou Synthetic Chemical Co., Ltd., Japan) | 1 part |
| C.I. Basic Red 15 | 10 parts |
| Chlorophthalic anhydride | 5 parts |
| Titanium oxide | 270 parts |

The coating formed from the ink composition on rubber articles discolored to white by vulcanization of the articles at 145° C. for 5 minutes, whereby it was able to clearly indicate the completion of vulcanization.

EXAMPLE 3

A purple ink composition was prepared by using the following components.

| | |
|---|---|
| Phenol resin ("Tamanol 100S", Arakawa Chemical Co., Ltd., Japan) | 90 parts |
| Styrene-butadiene rubber ("Nipol 1006", Nippon Zeon Co., Ltd., Japan) | 90 parts |
| Cyclohexanone | 500 parts |
| Xylene | 500 parts |
| Oil soluble dye ("Selest Yellow GRN") | 1 part |
| C.I. Basic Violet 15 | 50 parts |
| White pigment ("PAG 6806", Dainichi Color & Chemical Mfg. Co., Ltd., Japan) | 250 parts |
| Tetrachlorophthalic anhydride | 50 parts |

The ink composition was applied to a surface portion of a rubber article which was then vulcanized at 140° C. for 20 minutes. The coating formed from the ink composition discolored to yellow, thereby distinctly indicating the completion of vulcanization.

EXAMPLE 4

A purple ink composition was prepared by uniformly mixing the following components.

| | |
|---|---|
| C.I. Basic Red 35 ("Diacryl Brilliant Pink R-N", Mitsubishi Kasei Kogyo K.K., Japan) | 1.5 parts |
| Titanium oxide | 25.0 parts |
| Oil soluble dye ("SBN Blue-1", Hodogaya Chemical Co., Ltd., Japan) | 0.1 parts |
| Rosin ("Rosin WW", Tokushima Seiyu K.K., Japan) | 20.0 parts |
| Xylene | 120.0 parts |
| Toluene | 280.0 parts |
| Ethyl cellosolve | 20.0 parts |
| Styrene-butadiene rubber ("Nipol 1006", Nippon Zeon Co., Ltd., Japan) | 20.0 parts |
| 4-Chlorobenzenesulfonic acid | 10.0 parts |

The ink composition was applied to a rubber article which was then vulcanized at 145° C. for 15 minutes, thereby changing the color of the coated layer of composition to blue. The vulcanization of the rubber article was found appropriate.

EXAMPLE 5

An orange ink composition consisting of the following components was prepared.

| | |
|---|---|
| C.I. Basic Orange 22 ("Sumiacryl Orange R", Sumitomo Chemical Co., Ltd., Japan) | 1.0 parts |
| Titanium oxide | 20.0 parts |
| Rosin-modified xylene resin ("Nicanol A-70", Mitsubishi Gas Chemical Co., Ltd., Japan) | 25.0 parts |
| Xylene | 260.0 parts |
| Ethyle acetate | 20.0 parts |
| Synthetic rubber ("EP-21", Nippon Synthetic Rubber Co., Ltd., Japan) | |
| Toluene | 130.0 parts |
| 2-Fluoronaphthalenedisulfonic acid | 10.0 parts |

The coating formed from the composition on rubber articles changed its color from orange to white when the articles were vulcanized at 160° C. for 20 minutes.

EXAMPLE 6

A green ink composition was prepared using the following materials.

| | |
|---|---|
| C.I. Basic Blue 62 ("Astrazon Blue 5RL", Bayer A.G., Germany) | 1.5 parts |
| Acrylic resin ("Daikalac S-1235", Daido Kasei K.K., Japan) | 10.0 parts |
| Methylcyclohexane | 390.0 parts |
| Phenolic resin ("Tamanol 1010R", Arakawa Chemical Co., Ltd., Japan) | 10.0 parts |
| Yellow Pigment ("Hansa Yellow 10G", Hoechst A.G., Germany) | 25.0 parts |
| Natural rubber | 20.0 parts |
| Methyl ethyl ketone | 30.0 parts |
| 5-Chlorosalicylic acid | 15.0 parts |

The ink composition was found to adequately indicate the vulcanization of rubber products by turning into yellow when the products were vulcanized at 145° C. for 10 minutes.

EXAMPLE 7

A yellow ink composition was prepared by mixing the following materials.

| | |
|---|---|
| C.I. Basic Yellow 11 ("Kayacryl Yellow 2GL", Nihon Kayaku, K.K., Japan) | 1.5 parts |
| Titanium oxide | 30.0 parts |
| Rosin-modified maleic resin ("Teskid MRG", Tokushima Seiyu K.K., Japan) | 20.0 parts |
| Toluene | 240.0 parts |
| Ethyl cellosolve | 20.0 parts |
| Xylene | 60.0 parts |
| Methyl isobuthyl ketone | 220.0 parts |
| 2,3,4-trichlorobenzoic acid | 20.0 parts |

The ink composition applied on the surface of a rubber article changed the color to white when the article was vulcanized at 160° C. for 20 minutes.

EXAMPLE 8

An orange ink composition of this invention was prepared by uniformly mixing the following materials.

| | |
|---|---|
| Ethanol | 100 parts |
| Toluene | 900 parts |
| Rosin | 80 parts |
| Yellow pigment (containing 50% of ethylene-propylene rubber) ("Pigmotex Yellow 302E", Sanyo Color Co., Ltd., Japan) | 90 parts |
| C.I. Basic Red 12 | 50 parts |
| Tetrabromophthalic anhydride | 10 parts |

The coating formed from the ink composition discolored to yellow by vulcanization at 130° C. for 10 minutes.

EXAMPLE 9

A red ink composition of this invention was prepared by uniformly mixing the following materials.

| | |
|---|---|
| Toluene | 200 parts |
| Xylene | 800 parts |
| Triethyl phosphate | 100 parts |
| Phenol resin ("Tamanol #526", Arakawa Chemical Co., Ltd., Japan) | 100 parts |
| Styrene-butadiene rubber ("Nipol #2001", Nippon Zeon Co., Ltd., Japan) | 70 parts |
| C.I. Basic Red 14 | 15 parts |
| Oil soluble dye ("Neozapon Blue FLE", BASF AG) | 1 part |
| Finely divided dispersible coloring agent ("PAD-6701", Dainichi Color & Chemicals Mfg. Co., Ltd., Japan) | 200 parts |
| Tetrabromophthalic anhydride | 100 parts |

The ink composition changed the color to white after vulcanization of rubber articles at 150° C. for 20 minutes.

EXAMPLE 10

A number of ink compositions were prepared in the same manner as in Example 9 except that the tetrabromophthalic anhydride was used in varying amounts.

Table 1 given below shows the relationship between the amount of the tetrabromophthalic anhydride and the time required for the change of color.

TABLE 1

| Tetrabromophthalic anhydride Amount (part) | Discoloration 140° C. | 150° C. |
|---|---|---|
| 0 | 5 (min) | 3 (min) |
| 20 | 7 | 4 |
| 40 | 15 | 8 |
| 60 | 22 | 12 |
| 80 | 30 | 16 |
| 100 (Ex. 8) | 36 | 20 |
| 200 | 78 | 42 |
| 300 | 120 | 65 |

We claim:

1. An ink composition for indicating progress and completion of vulcanization of rubber articles comprising, per 100 parts by weight of the composition,
   (i) 0.01 to 10 parts by weight of at least one methine dye,
   (ii) 1 to 40 parts by weight of at least one member selected from the group consisting of rosin, rosin derivative, petroleum resin, phenol resin, xylene resin, alkyd resin, cumarone-indene resin, acrylic resin, epoxy resin, ketone resin and styrene-maleic acid resin,
   (iii) 0.5 to 50 parts by weight of at least one high molecular weight component selected from the group consisting of cellulose resin, polyvinyl butyral, vinyl chloride-vinyl acetate copolymer, ethylene-vinyl acetate copolymer, polyamide, synthetic rubber and natural rubber,
   (iv) 30 to 80 parts by weight of at least one organic solvent capable of dissolving the components (ii) and (iii), and
   (v) chlorophthalic anhydrides and bromophthalic anhydrides.

2. The ink composition as defined in claim 1 in which component (i) is present in an amount of 0.5 to 5 parts by weight per 100 parts by weight of the ink composition.

3. The ink composition as defined in claim 1 in which component (ii) is present in an amount of 5 to 20 parts by weight per 100 parts by weight of the ink composition.

4. The ink composition as defined in claim 1 in which component (iii) is present in an amount of 5 to 20 parts by weight per 100 parts by weight of the ink composition.

5. The ink composition as defined in claim 1 in which component (iv) is present in an amount of 40 to 60 parts by weight per 100 parts by weight of the ink composition.

6. The ink composition as defined in claim 1 in which component (v) is present in an amount of 0.5 to 25 parts by weight per 100 parts by weight of the ink composition.

7. The ink composition as defined in claim 1 which further contains 0.1 to 50 parts by weight of at least one pigment per 100 parts by weight of the composition.

8. The ink composition as defined in claim 1 which further contains 0.1 to 2 parts by weight of at at least one oil-soluble dye per 100 parts of the composition.

9. The ink composition as defined in claim 1 wherein component (v) is selected from the group consisting of chlorophthalic anhydride, tetrachlorophthalic anhydride, bromophthalic anydride, and tetrabromophthalic anhydride.

10. The ink composition as defined in claim 1 wherein component (v) comprises tetrabromophthalic anhydride.

* * * * *